United States Patent [19]

Reeb

[11] Patent Number: 5,439,970
[45] Date of Patent: Aug. 8, 1995

[54] PAINT LATICES COMPRISING BENZOPHENONE/ACRYLIC COPOLYMERIZATES

[75] Inventor: Roland Reeb, Gressy, France

[73] Assignee: Rhone-Poulenc Chimie, Courbevoie Cedex, France

[21] Appl. No.: 145,622

[22] Filed: Nov. 4, 1993

[30] Foreign Application Priority Data

Nov. 4, 1992 [FR] France .............. 92 13196

[51] Int. Cl.⁶ .............. C28L 33/08; C28L 33/10; C28L 39/00; C28L 27/04
[52] U.S. Cl. .............. 524/558; 524/551; 524/555; 526/292.3; 526/301; 526/304; 526/316
[58] Field of Search .............. 524/551, 555, 558; 526/292.3, 301, 304, 316

[56] References Cited

U.S. PATENT DOCUMENTS

| | | | |
|---|---|---|---|
| 3,214,492 | 10/1965 | Tocker | 260/878 |
| 3,320,198 | 5/1967 | Hill | 260/29.6 |
| 3,429,852 | 2/1969 | Skoultchi | 260/47 |
| 5,264,533 | 11/1993 | Rehmer | 526/301 |

*Primary Examiner*—Peter A. Szekely
*Attorney, Agent, or Firm*—Burns, Doane, Swecker & Mathis

[57] ABSTRACT

Acrylic polymers having glass transition temperatures less than 0° C., notably formulated as exterior paint latices, comprise the copolymerizate of (a) at least one alpha,beta-monoolefinically unsaturated carboxylic monomer, (b) at least one (meth)acrylic acid ester of a primary or secondary alcohol having from 1 to 18 carbon atoms, optionally styrene, and (c) a comonomer having the formula (1):

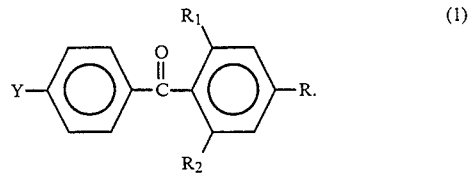

18 Claims, No Drawings

PAINT LATICES COMPRISING BENZOPHENONE/ACRYLIC COPOLYMERIZATES

BACKGROUND OF THE INVENTION

1. Field of the Invention

The present invention relates to binding agents, or binders, for paints, notably exterior paints, or pliable semi-thick coatings particularly well suited for the protective coating of building facades and containing acrylic or styrene/acrylate latices that comprise a benzophenone copolymerizate. By the term "pliable semi-thick coating" is intended a coating material having a consistency similar to that of putty.

2. Description of the Prior Art

Interior paints have long been known to this art that are easy to apply, have minimal odor, and are easy to clean, in which the organic polymer constituting the latex binding agent is "hard," namely, it has a glass transition temperature (Tg) of more than 0° C. These paints applied to exterior surfaces do not collect dust and provide a satisfactory non-sticky surface. However, they exhibit mediocre adhesiveness to the base substrate and have poor resistance to cracking.

Acrylic paints of the type described above are applied to exterior surfaces of buildings, in order to form an effective coating which protects against rainwater penetration, by virtue of their capacity to cover over cracks or micro-cracks in the base, both those that exist currently and those that ultimately will form. The elastomer coating, thus, must necessarily exhibit strong capacities of deformation without the appearance of tears (resistance to cracking) or separation (adhesiveness) of the coating, over a wide temperature range. In addition to its role in protecting against inclement weather, the coating is important from an aesthetic standpoint, which is assessed based on its resistance to soiling principally resulting from the capture and incrustation of dust on the surface of a coating that is excessively soft and to excessively-high surface adhesion. The resistance of the coating to soiling represents, therefore, another very important criterion to take into account in order to evaluate the quality of exterior acrylic paints.

Acrylic paints have indeed been applied to exterior face surfaces, in which the organic polymer composing the latex binding agent is of the "soft" type (Tg of less than 0° C., and preferably lower than −10° C). Consequently, this paint provides proper adhesiveness and resistance to cracking; however, the resistance to dirt and the surface-adhesion property are not satisfactory. One solution to this technical problem is described in U.S. Pat. No. 3,320,198, which relates to an exterior paint whose base is an aqueous acrylic polymer latex containing benzophenone in the proportion of from 0.3% to 10%, and preferably 0.5% to 3% by weight of the weight of the polymer. Nonetheless, to be truly effective, such paints must contain large quantities of benzophenone.

Moreover, benzophenone or derivatives thereof are often solid at ambient temperature, a fact which requires that they be added to the latex as a solution in an organic solvent such as toluene and xylene, or as an aqueous emulsion.

All of these organic compounds (benzophenone and solvents) have a significant vapor pressure, which imparts to the latex a detectable odor which may adversely affect the individual applying the paint. In addition, current ecological guidelines discourage the use of organic solvents.

EP-A-010,000 describes paints similar to those characterized in U.S. Pat. No. 3,320,198. However, to improve the effectiveness of the benzophenone and, therefore, to reduce the quantities used, EP-A-101,000 proposes use of a polymer substituted by radicals that are hardenable by oxidation in air, i.e., alkenyl radicals borne by amide or ester groups.

The paints thus produced have anti-soiling and adhesive properties which remain insufficient, and the benzophenone must still be added as a solution in an organic solvent.

SUMMARY OF THE INVENTION

Accordingly, a major object of the present invention is the provision of aqueous acrylic polymer or styrene/acrylate-based latices that are useful binding agents for pliable semi-thick paints or coatings, and most particularly, for exterior paints; such binders are devoid of organic solvents and impart to the paint, once it is spread and dried, good pliability even at an ambient temperature of −10° C., the lower limit of use being dictated by the market, good adhesion to the base, and good resistance to soiling.

Briefly, the present invention features binding agents for acrylic or styrene/acrylate paints, notably for exterior paints or pliable semi-thick coatings, comprising a base acrylic polymer having a Tg of less than 0° C., said acrylic polymer comprising the copolymerizate of:

(a) at least one alpha,beta monoolefinically unsaturated carboxylic monomer, (b) at least one acidic (meth)acrylic ester of a primary or secondary alcohol having from 1 to 18 carbon atoms, and (c) an effective amount of a comonomer corresponding to the formula (1):

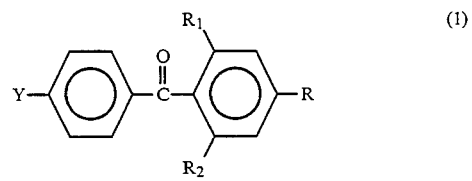

in which the radicals R, $R_1$ and $R_2$, which may be identical or different, are each H, $CH_3$, OH, $NH_2$, COOH or $COOCH_3$, and Y is an organic hydrocarbon-containing radical bearing an alpha,beta olefinically unsaturated substituent that is copolymerizable with (a) and (b) and which may optionally contain at least one heteroatom selected from among O, N, and S, said monomer of formula (1) having a molecular weight of less than 600, and preferably of less than 400.

DETAILED DESCRIPTION OF PREFERRED EMBODIMENTS OF THE INVENTION

More particularly according to the present invention, all parts and percentages given herein are by weight, unless otherwise indicated. Also, the expression (meth)acrylic and (meth)acrylate connotes methacrylic and/or acrylic, methacrylate and/or acrylate.

Preferably, the comonomer (c) has the following formula (2):

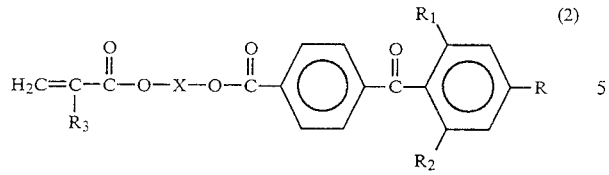

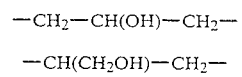

in which R, $R_1$ and $R_2$ have the same definitions as in formula (1) and, preferably, $R_1=R_2=H$ and $R=Cl$, $R_3$ is H or $CH_3$ and X is a linear or branched $C_1$-$C_6$ divalent hydrocarbon radical, optionally containing an oxygen atom.

Exemplary of the radicals X are those corresponding to the formulae:

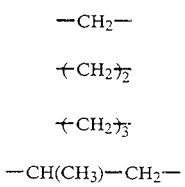

A preferred compound corresponding to formula (2) is UVECRYL P 36, marketed by Société Radcure Specialities S. A., Anderlecht, Belgium. This compound has formula (3) below; its registration number in *Chemical Abstracts* is RN=85340-63-2:

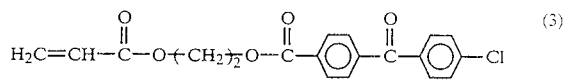

Compound (3) thus corresponds to formula (2) wherein $R_1=R_2=R_3=H$, $R=Cl$ and $X=-(CH_2)_2-$.

The monomers corresponding to formulae (1) or (2) are either known compounds or are easily synthesized by reacting an appropriate benzophenone derivative with an ethylenically unsaturated organic compound providing the radical Y.

Other such comonomers include those corresponding to the following formulae:

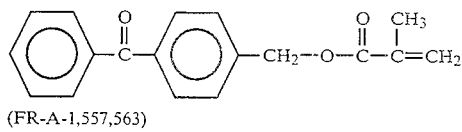

(FR-A-1,557,563)

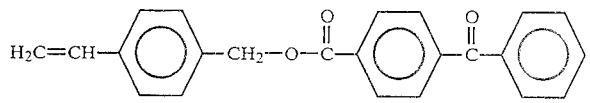

(DE-A-2,818,783)

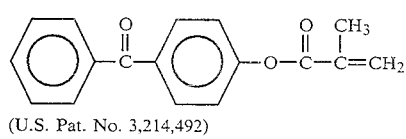

(U.S. Pat. No. 3,214,492)

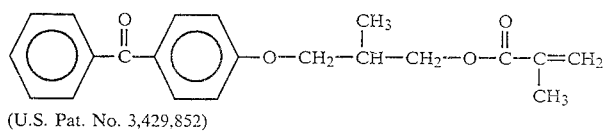

(U.S. Pat. No. 3,429,852)

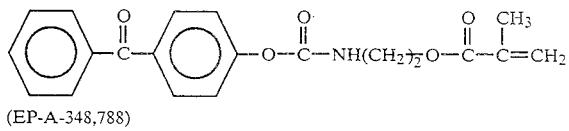

(EP-A-348,788)

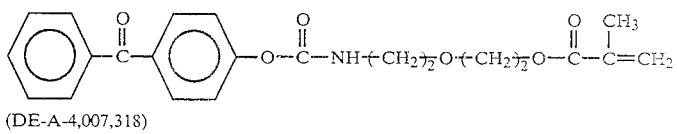

(DE-A-4,007,318)

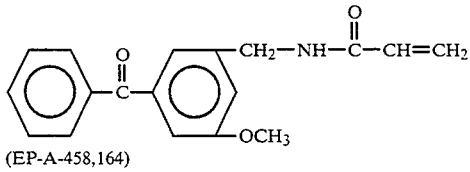

(EP-A-458,164)

and the para-acryloxybenzophenones described in EP-A-246,848.

By the expression "effective amount" of monomer (c) is intended an amount that permits attaining the objective of the present invention as regards, most notably, the anti-soiling and cracking-resistance properties. The amounts of monomer (c) to be used are, indeed, very low, and are always lower, all other parameters being equal, than those employed according to U.S. Pat. No. 3,320,198 and EP-A-010,000. According to the invention it is thus advantageous to use from 0.01% to 3%, and preferably from 0.05% to 2%, by weight of monomer (c) relative to the total weight of the monomers. Quantities of monomers (c) ranging from 0.1% to 1% by weight are normally suitable. In reality, these quantities are low, since only a portion of the monomer (c) molecule is actinically active.

As regards the mixture of monomers that are used to prepare the organic polymer of the latex, any mixture is suitable as long as, first, the mixture contains the monomers (a), (b), and (c), preferably in a proportion of at least 80% by weight, and, second, the resulting copolymer has a Tg of less than 0° C., and preferably less than $-10°$ C. The Tg of the polymer can be determined by the technique described by Fox, *Bull. Am. Physics Soc.*, A, 3, page 123 (1956), measured via the Brandrup and Immergat method described in *Polymer Handbook*, Sec. III, pp. 61–63, Interscience (1966).

Such mixtures of comonomers are described, in particular, in said U.S. Pat. No. 3,320,198 and EP-A-010,000.

A preferred monomer mixture comprises:
(a) from 1% to 6%, and preferably from 2% to 4% by weight of at least one alpha,beta ethylenically unsaturated carboxylic acid, e.g., (meth) acrylic, maleic, fumaric, and itaconic acid;
(b) from 55% to 95% by weight of monomers that are esters of (meth)acrylic acid, the alkyl moiety of which having 1 to 8 carbon atoms and including both "hard" and "soft" monomers;
(c) from 0.01% to 3% by weight of a benzophenone compound corresponding to formula (1); and
(d) from 0% to 40%, and preferably 5% to 20% by weight styrene.

Exemplary "soft" acrylic monomers include most alkyl esters of (meth)acrylic acid, the alkyl moiety having 1 to 18 atoms of carbon, in particular 2-ethylhexyl (meth)acrylate, isooctyl methacrylate, n-butylacrylate, and n-octylacrylate. Exemplary "hard" acrylic monomers include alkyl methacrylates having 1 to 4 carbon atoms, e.g., methyl methacrylate.

All or a portion of the "hard" acrylic monomers may be replaced by a vinylaromatic monomer, such as styrene; the paint is then deemed a styrene/acrylate paint.

It is advantageous that the monomer mixtures further comprise small amounts of at least one ethylenically unsaturated monomer, these amounts normally being less than 2% by weight and greater than 0.1% by weight of the total weight of the monomers. Such monomers include:
(1) sulfates and sulfonates of an alkaline metal, such as sodium methylsulfonate, sodium sulfoethyl(meth)acrylate, sodium 2-acrylamido-2-methylpropane sulfonate, sodium styrene sulfonate, and sodium vinylsulfonate;
(2) amides of alpha-beta ethylenically unsaturated carboxylic acid, most notably acrylamide, N-hydroxyethylacrylamide, N-methylolacrylamide, and N-(dimethylaminoethyl)acrylamide.

In a preferred embodiment of the invention, the polymer constituting the latex also contains a radical oxidizable in atmospheric oxygen which imparts to the polymer the property of hardening (crosslinking) in atmospheric oxygen.

These radicals may be unsaturated aliphatic alkene radicals containing a maximum of 18 carbon atoms and borne by ester and amide groups, such as those described in EP-A-010,000. These radicals are incorporated into the polymer chain by reacting the hydroxamide or the glycidyl ester of the corresponding unsaturated fatty acid with the free carboxyl groups of the polymer network resulting from the unsaturated carboxylic acid monomer. This result may also be attained via the copolymerization of the (meth)acrylates with unsaturated fatty chains, e.g., linolenyl acrylate, as described by Fung-Bor Chen et al, *Journal of Applied Polymer Science*, Vol. 30, 4551–4582 (1985). Another such technique is the copolymerization of allyl functions, e.g., allyl (meth)acrylate or diallyl phthalate, as described in EP-A-297,781.

In accordance with the invention, the preferred radical oxidizable in air is the dicyclopentadienyl radical incorporated into the polymer, using a proportion of from 1% to 10%, and preferably from 3% to 6% of the total weight of the monomers, of at least one dicyclopentadienyl comonomer corresponding to the formula (4):

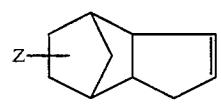 (4)

in which Z is an alpha, beta-olefinically unsaturated hydrocarbon-containing organic radical copolymerizable with the monomers (a), (b), and (c) and which may optionally contain at least one heteroatom selected from among O, N, and S, said monomer of formula (4) having a molecular weight of less than 600, and preferably of less than 400.

Exemplary monomers having the formula (4) include dicyclopentadienyl(meth)acrylate, marketed by the company formerly named Alcolac, now Rhône-Poulenc, Inc., and described in U.S. Pat. No. 4,144,212, as well as dicyclopentadienyloxyethylmethacrylate, marketed by Elf-Atochem.

Other such monomers are described in GB-A-1,600,628, U.S. Pat. No. 4,145,503, EP-A-355,032, DD-A-256,803, and EP-a-167,902. The monomer mixture can also contain small amounts (generally of up to 1% by weight) of a crosslinking agent, such as a (meth)acrylic diester of a diol, e.g., ethylene glycol dimethacrylate. The monomer mixture is then polymerized by radical polymerization in an aqueous emulsion.

This emulsion polymerization is carried out in conventional fashion, in one or more steps.

In particular, a radical-producing polymerization initiator is used which generates free radicals, such as ammonium persulfate, used either alone or in combination with an accelerator, such as metabisulfite or sodium thiosulfate, sodium formaldehyde sulfoxylate and metallic ions (iron, cobalt, copper). Other initiators, e.g., oxygenated water or tert-butyl hydroperoxide, may be used in combination with a reducing agent.

The initiator and accelerator, which, taken together, constitute what is normally termed the catalyst, are generally used in a proportion of 0.1% to 2% each, as a function of the weight of the monomers to be copolymerized. The polymerization temperature advantageously ranges from 30° C. to 100° C., and preferably from 50° C. to 90° C.

Exemplary emulsifying agents include the alkali metal and ammonium, alkyl-, aryl-, alkylaryl-, and arylalkylsulfonate and sulfate salts, or polyethersulfate salts; the corresponding phosphates and phosphonates; and fatty acids, esters, alcohols, amines, amides, and ethoxylated alkylphenols. In one embodiment of the invention, in conventional fashion, one monomer or a fraction of the monomers is polymerized in a first step, and then the other monomers are added, in order to form heterogeneous particles.

Accordingly, a portion or all of the unsaturated carboxylic acid based monomers can be added continuously, or by fractions after the beginning of polymerization, to ensure that a sufficient quantity of acid groups will be situated at the surface of the polymer particles formed during polymerization.

The dry solids content of the carboxylated latex normally ranges from 20% to 70%, and preferably from 40% to 60% by weight. The polymer particle diameter typically ranges from 0.05 to 0.5 $\mu$m.

After polymerization, the carboxylated latexes are normally adjusted to a neutral or basic pH using one or more bases, such as alkaline hydroxides, liquid ammonia, or water-soluble organic amines, such as 2-aminomethylpropanol and diethylaminoethanol.

To produce acrylic or styrene/acrylate paints, the carboxylated latex binding agent, preferably neutralized as described above, is conventionally mixed with a pigmented dispersion containing conventional additives, as well as pigments and pulverulent filler materials. Exemplary such conventional additives include, in particular, dispersing agents such as alkaline polyacrylates, thickening agents such as nonionic hydrosoluble polyurethanes, optionally coalescence agents such as the monobutyl ether of ethylene glycol, anti-foaming agents such as a polydimethylsiloxane oil, and antifreezes, such as ethyleneglycol.

The most widely-used pigment is titanium dioxide (rutile or octahedrite). The pulverulent fillers conventionally employed are calcium carbonate, silica, talc, and calcium sulfate.

The paints have a preferred pigment concentration by volume ranging from 10% to 40%, and a total dry solids content of from 25% to 75% by weight, and preferably from 35% to 65%. The pliable semi-thick coatings have the highest dry solids content, normally greater than 50%.

The paints according to the invention may be applied to the exterior surfaces of buildings by any suitable means, such as brushes, rollers, air sprayers, etc.

The paints can be applied to bases made of various materials, and, in particular, those made of metal such as aluminum, wood, cement, and bricks, with or without preliminary coating with an adhering primer.

The paint films thus deposited and exposed for several days to the sun incorporates on the surfaces thereof a very thin, hard, anti-soiling layer which does not attract dust. The formation of this very thin anti-soiling layer may be facilitated by radiation using an actinic lamp whose radiation wavelength is from 200 to 700, and preferably from 80 to 400 millimicrons. In its greatest thickness in contact with the base, the paint film is, to the contrary, not hardened, and it preserves its properties of resistance to cracking and adhesiveness (unchanged elongation at rupture).

In order to further illustrate the present invention and the advantages thereof, the following specific example is given, it being understood that same is intended only as illustrative and in nowise limitative.

EXAMPLE (a) Preparation of the reference latex Lo (without benzophenone):

The following monomers were introduced into a stainless steel 25-liter reaction vessel fitted with an agitator and a double water-circulation jacket permitting adjusting the temperature to 80° C. inside the reactor during polymerization:

(i) 83 parts by weight of water;
(ii) 9 parts by weight of styrene;
(iii) 75.5 parts by weight of butyl acrylate;
(iv) 10 parts by weight of 2-ethylhexyl acrylate;
(v) 0.5 part by weight of ethyleneglycol dimethacrylate;
(vi) 4 parts by weight of dicyclopenetadienyl acrylate;
(vii) 2.7 parts by weight of acrylic acid;
(viii) 0.5 part by weight of acrylamide;
(ix) 0.5 part by weight of sodium sulfoethylmethacrylate;
(x) 0.1 part by weight of sodium alkylsulfonate; and
(xi) 1.6 parts by weight of ammonium persulfate.

Polymerization was carried out at 80° C. for 10 hours.

At the end of polymerization, the pH of the latex was adjusted by adding approximately 1.9 parts 20% liquid ammonia and about three parts 2-amino-2-methylpropanol in a 50% aqueous solution.

The neutralized latex La had an average granulometry of 0.15 $\mu$m, a Tg of $-40°$ C., a dry solids content of 53.3%, a pH of 8, and a measured Brookfield viscosity at 50 rpm of 3,320 mRa.s.

Preparation of the Latex L'o:

The process was exactly the same as that used to prepare the latex Lo, except that four parts dicyclopentadienyl acrylate and four parts styrene were employed (granulometry=0.16 $\mu$m, Tg=39° C., Brookfield viscosity=3,500 mPa.s, and dry solids content= 53.6%).

(b) Preparation of latexes in accordance with the invention L$_1$ to L$_5$:

Preparation of L$_1$:

The process was identical to that used to formulate Lo, except that no ethyleneglycol dimethacrylate was employed and one part UVECRYL P 36 by weight was added, or 0.9% of the polymer.

The neutralized latex $L_1$ had an average granulometry of 0.16 μm, a Tg of −39° C., a dry solids content of 53.5%, a pH of 8, and a Brookfield viscosity of 3,150 mPa.s.

Preparation of $L_2$:

The same procedure as that used to prepare Lo was followed, except that 0.5 part UVECRYL P 36, or 0.48% of the polymer, was added. The neutralized latex $L_2$ had an average granulometry of 0.16 μm, a Tg of −40° C., a dry solids content of 53.5%, a pH of 8, and a Brookfield viscosity of 3,200 mPa.s.

Preparation of $L_3$:

The process was identical to that used to prepare Lo, except that one part UVECRYL P 36, or 0.96% of the polymer, was added.

The neutralized latex $L_3$ had an average granulometry of 0.15 μm, a Tg of −39° C., a dry solids content of 53.5%, a pH of 8, and a Brookfield viscosity of 3,080 mPa.s.

Preparation of $L_4$:

The process was identical to that used to prepare Lo, except that the four parts dicyclopenetadienyl acrylate were replaced with four parts dicyclopentadienyl oxyethylmethacrylate marketed by Atochem under the trademark DCPOEMA. The characteristics of $L_4$ were: an average granulometry of 0.16 μm, a Tg of −40° C., a dry solids content of 53.4%, an a Brookfield viscosity of 3,260 mPa.s.

Preparation of $L_5$:

The same procedure used for Lo was followed, except that eight parts of styrene and 5 parts of dicyclopentadienyl methacrylate were employed in place of the 4 parts dicyclopentadienyl acrylate. The characteristics of $L_5$ were: an average granulometry of 0.16 μm, a Tg of −39° C. a dry solids content of 53.1%, and a Brookfield viscosity of 3,000 mPa.s.

(c) Preparation of paints Po to $P_5$:

In a dispersing apparatus for paints containing the binding agent L, the additives, pigments, and pulverulent materials were added to produce a paint that could be applied as a semi-thick waterproofing coating having the following composition:

| | |
|---|---|
| Latex L | 674.5 parts by weight |
| Sodium hexamethaphosphate (10%) | 2.95 parts by weight |
| COATEX P 90 dispersing agent (acrylic polymer) | 1.40 parts by weight |
| Proxel GXL Biocide (ICI) | 0.70 part by weight |
| Propyleneglycol | 10.40 parts by weight |
| NOPCO 8034 Anti-Foaming Agent (Henkel Nopco) | 0.70 part by weight |
| Liquid Ammonia | 1.07 parts by weight |
| Titanium oxide RL 68 (Thann and Mulhouse) | 99.90 parts by weight |
| DURCAL 5 calcium carbonate (omya) | 71.77 parts by weight |
| DURCAL 15 calcium carbonate (omya) | 71.77 parts by weight |
| Oxo Talc (Talc de Luzenac) | 40,000 parts by weight |
| NOPCO 8034 anti-foaming agent (Henkel Nopco) | 0.70 part by weight |
| VISCOATEX 46 acrylic thickener (10%) | 3.85 parts by weight |
| COATEX BR 100 thickener (10%) | 19.00 parts by weight |
| Liquid ammonia (20%) | 1.35 parts by weight |

In this manner, the comparison paint Po was obtained from latex L=Lo, and the comparison paint P′o from L′o containing, in addition, 0.50% by weight benzophenone relative to the weight of the polymer and added as a solution in toluene. The paints $P_1$ to $P_5$ according to the invention were obtained using binding agents L=$L_1$ to $L_5$. Moreover, paint P″o was identical to P′o, except that P″o contained no benzophenone.

(d) Measurement of resistance to soiling:

A substrate was coated using paints Po, P′o, P″o, and $P_1$ to $P_5$ with an Erichsen applicator, model 509/1, to provide a paint film 325 μm thick.

The substrate was a carbon sheet covered with aluminum. The sheet was permitted to dry for 48 hours at 23° C. under 50% relative humidity. Rectangular samples (160 mm×240 mm) were cut from this sheet and exposed for 166 hours in a Weather-O-Meter (WOM) marketed by the Atlas Company, while operating in a dry atmosphere and using a Xenon arc lamp 5000 Watts fitted with pyrex filters, providing the lamp an emission spectrum approaching the solar radiation spectrum.

The magnitude of the crosslinking resulting from radiation was evaluated by the greater or lesser capability of the paint film to fix black iron oxide dust (303 T/Bayer).

The irradiated samples were painted with iron oxide using a flat brush. They were then wiped using a flexible paper (Joseph paper) until there was a total absence of transfer of pigment to the paper.

The soil level was evaluated according to the measurement of the luminescence LU using a BYK Color-Gloss colorimeter-brilliance meter. The final result was the average of 10 readings.

The higher the value expressed as a percent, the better the resistance to soiling of the coating.

The results obtained are reported in the following Table, which indicates luminescence as measured on different coatings before and after exposure to the WOM, and also after soiling the film with iron oxide. The resistance of the coating to soiling is improved to the extent that the loss of luminance observed before and after soiling is low.

TABLE

| Paint Sample | Luminance $LU_0$ before WOM before soiling % | Luminance $LU_1$ after WOM before soiling % | Luminance $LU_2$ after WOM after soiling % | Loss of Luminance (soiling) $LU_2-LU_1$ |
|---|---|---|---|---|
| Po | 97.14 +/− 0.07 | 96.62 +/− 0.15 | 40.62 +/− 0.61 | 56 |
| P′o | 97.06 +/− 0.08 | 96.44 +/− 0.11 | 41.94 +/− 0.65 | 54.5 |
| P″o | 97.18 +/− 0.07 | 96.54 +/− 0.15 | 39.48 +/− 0.72 | 57.06 |
| $P_1$ | 97.21 +/− 0.07 | 96.62 +/− 0.27 | 54.75 +/− 0.98 | 41.87 |
| $P_2$ | 97.29 +/− 0.13 | 96.52 +/− 0.14 | 47.35 +/− 0.57 | 49.17 |
| $P_3$ | 97.44 +/− 0.1 | 96.73 +/− 0.12 | 53.35 +/− 0.9 | 43.88 |
| $P_4$ | 97.32 +/− 0.08 | 96.60 +/− 0.20 | 52.55 +/− 0.70 | 44.05 |

TABLE-continued

| Paint Sample | Luminance $LU_0$ before WOM before soiling % | Luminance $LU_1$ after WOM before soiling % | Luminance $LU_2$ after WOM after soiling % | Loss of Luminance (soiling) $LU_2-LU_1$ |
| --- | --- | --- | --- | --- |
| $P_5$ | 97.30 +/− 0.09 | 96.58 +/− 0.15 | 49.10 +/− 0.68 | 47.48 |

It will be seen from the Table that the coatings P'o and P''o containing no photo-initiator was the most highly soiled after exposure to the WOM (166 hours). The resistance to soiling increases as the amount of photo-initiator incorporated into the polymer increases.

At equivalent molar quantities of benzophenone initiator, which was the case in paints P''o and $P_2$, it was found that the UVECRYL P36 in $P_2$ was significantly more reactive than the benzophenone as regards surface crosslinking of the coating during exposure to the WOM.

The above results were observed for all types of monomers used containing the dicyclopentadienyl group.

Similar results were obtained by exposing to natural soiling for six months on the outside of specimens coated with the same paints and exposed southward at an inclination of 45°.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An exterior latex paint comprising an aqueous dispersion of an acrylic polymer and a pigment, said acrylic polymer having a glass transition temperature of less than 0° C. and comprising the copolymerizate of (a) at least one alpha, beta-monoolefinically unsaturated carboxylic monomer, (b) at least one (meth)acrylic acid ester of a primary or secondary alcohol having from 1 to 18 carbon atoms, and a comonomer (c) the formula selected from the group consisting of:

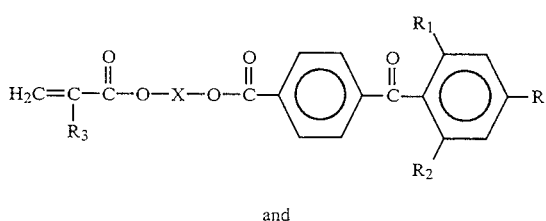

and

in which the radials R, $R_1$ and $R_2$, which may be identical or different, are each H, $CH_3$, OH, $NH_3$, COOH or $COOCH_3$; and $R_3$ is H or $CH_3$ and X is a linear or branched $C_1$-$C_6$ hydrocarbon radical, or an oxygen-containing such hydrocarbon radical.

2. The latex paint as defined by claim 1, comprising from 0.01% to 3% by weight of said comonomer (c), relative to the total weight of said monomers (a), (b) and (c).

3. The latex paint as defined by claim 2, comprising from 0.5% to 2% by weight of said comonomer (c).

4. The latex paint as defined by claim 2, comprising from 0.1% to 1% by weight of said comonomer (c).

5. The latex paint as defined by claim 1, comprising a pendant radical oxidizable in atmospheric oxygen.

6. The latex paint as defined by claim 5, comprising the copolymerizate of a comonomer having the formula (4):

$$Z-\text{[structure]} \quad (4)$$

in which Z is an alpha,beta-olefinically unsaturated hydrocarbyl radical copolymerizable with said monomers (a) and (b), optionally comprising at least one O, N or S heteroatom, and said comonomer (4) having a molecular weight less than 600.

7. The latex paint as defined by claim 1, comprising the copolymerizate of (a) from 1% to 6% by weight of at least one alpha,beta-monoolefinically unsaturated carboxylic acid, (b) from 55% to 95% by weight of at least one alkyl (meth)acrylate, and (c) from 0.01% to 3% by weight of said comonomer (1).

8. The latex paint as defined by claim 7, said copolymerizate further comprising from 1% to 10% by weight of dicyclopentadienyl oxyethyl (meth)acrylate.

9. The latex paint as defined by claim 8, said copolymerizate further comprising up to 40% by weight of styrene.

10. The latex paint as defined by claim 1, having a glass transition temperature of less than −10° C.

11. The acrylic polymer as defined by claim 9, said (meth)acrylate (b) comprising a soft comonomer.

12. The latex paint as defined by claim 9, said (meth)acrylate (b) comprising a hard comonomer.

13. The latex paint as defined by claim 1, comprising the copolymerizate of a di(meth)acrylate crosslinking agent.

14. The latex paint as defined by claim 1, having a dry solids content ranging from 20% to 70% by weight.

15. The latex paint as defined by claim 14, having a polymer particle size ranging from 0.05 to 0.5 μm.

16. The latex paint as defined by claim 1, having a neutral or basic pH.

17. The latex paint as defined by claim 1, comprising from 10% to 40% by volume of pigment.

18. A substrate coated with the latex paint as defined by claim 1.

* * * * *